United States Patent [19]

Faure et al.

[11] 4,353,729

[45] Oct. 12, 1982

[54] PLANT FERTILIZING AND GROWTH ACTIVATING STRUCTURES AND APPLICATIONS THEREOF

[75] Inventors: Alain Faure, Saint-Chamond; Paul Maldonado, Saint Symphorien d'Ozon; Jean-François Husson, Bron; Camille Coste, Ceret, all of France

[73] Assignee: Societe Nationale Elf Aquitaine, Paris, France

[21] Appl. No.: 139,875

[22] Filed: Apr. 14, 1980

[30] Foreign Application Priority Data

Apr. 13, 1979 [FR] France .................................. 79 09417

[51] Int. Cl.$^3$ ................................................ C05G 1/00
[52] U.S. Cl. ........................................... 71/11; 71/21; 71/24; 71/27; 71/64.13; 71/903
[58] Field of Search ..................... 71/1, 11, 27, 61–63, 71/64 D, 64 G, 64 E, 64 F, 64.3, 64.4, 64.6, 64.11, 64.12, 903, 904, 21

[56] References Cited

U.S. PATENT DOCUMENTS

| Re. 27,238 | 11/1971 | Stansbury et al. | 71/27 |
|---|---|---|---|
| 1,747,281 | 2/1930 | Baker et al. | 71/63 |
| 4,133,668 | 1/1979 | Young | 71/27 X |

FOREIGN PATENT DOCUMENTS

| 46-24051 | 7/1971 | Japan | 71/11 |
|---|---|---|---|
| 52-15084 | 4/1977 | Japan | 71/24 |

*Primary Examiner*—Ferris H. Lander
*Attorney, Agent, or Firm*—Burgess, Ryan and Wayne

[57] ABSTRACT

Microporous, fertilizing materials or compositions, retaining water and accelerating the germination and growth of plants, characterized in that they are composed of a hydrocarbon base containing asphaltenes modified by an oxidation agent producing a liberation of gas, directly, or indirectly, in combination with at least one mineral compound reacting in acid medium, to which materials or compositions it is possible to add, by simple mixing, appropriate common manures, oligo-elements and fertilizers.

Method of preparation of fertilizing materials or compositions, characterized in that a non-acid oxidizing agent is mixed with a molten hydrocarbon base in a proportion of 25 to 50% by weight with 5 to 10% of a mineral compound, the mixture is kept for 5 to 7 hours at 180°–250° C., poured into metal trays, cooled, ground and screened into granules of a diameter ranging from 1 to 3 mm.

9 Claims, No Drawings

PLANT FERTILIZING AND GROWTH ACTIVATING STRUCTURES AND APPLICATIONS THEREOF

The present invention is directed to a method for the preparation of bituminous and asphaltenic materials, modified chemically and having fertilizing and growth-activating properties on plants, including the resulting materials and to their application in agriculture.

The chemical modifications imparted to various bitumens and asphaltenes are intended to promote the creation of polar sites which permit the retention of water by a hydrogen bond, to cause a controlled oxidation of the hydrocarbon structures in order to promote the degradation of these materials by bacteria, and to more easily liberate the growth hormones and substances of the auxinic, gibberellinic and humic type present in the heavy fractions of petroleum and imprisoned in the midst of the asphaltenic aggregates.

Moreover, in the method of preparation described below, what is sought for is the obtention of microporous compounds of large specific surface, facilitating bacterial development and the retention, by adsorption effect, of water and the mineral salts indispensable to plants. The physical-chemical bonds obtained between the mineral salts and the hydrocarbon structure are strong enough to avoid the leaching phenomenon frequently observed in zones of intensive cultivation, which are large consumers of manure and sometimes cause pollution of the phreatic levels. Moreover, these bonds are easily broken by the plant, and hence the mineral salts are liberated gradually according to the needs of the plant. These products can be used in various types of cultivation and of vegetation, for example:

in intensive cultivation as an agent making it possible to limit the quantity of manure and oligoelements necessary to the obtention of high yields.

in horticulture, as an agent of total or partial replacement of industrial composts, in poor or desert soils, as an agent of fertilization and water retention.

in deprived soils where certain plant diseases are due to soil deficiencies in certain mineral elements (boron, manganese, zinc, selenium, sulfur, copper). Now, in most cases, these elements are present in the ground, but in a chelated form, hence unavailable to the plant. The presence, in the structures below, of naphthenic acids serving as transporters of mineral ions makes it possible to liberate these elements and effectively combat this type of diseases, in sterilized soils where the restart of vegetation after a fire is long and difficult, owing to the destruction of the microflora. The compounds of the invention considerably limit this time of latency by promoting the proliferation of microorganisms.

It is possible to incorporate, in the materials or compositions described in the present invention, the manures and oligo-elements indispensable to plants, by a simple mixing operation, since the modified bitumens and asphaltenes appear in solid, hard and friable form, very easy to grind.

It is preferable, nevertheless, to incorporate these nutritive elements "in situ" in the course of the chemical reaction, which has the effect of liberating these substances much more slowly in the ground.

The bituminous and asphaltenic materials according to the invention are obtained from a hydrocarbon base containing asphaltenes modified by an oxidizing agent or an acid causing a liberation of gas directly, or indirectly in the presence of a mineral compound reacting in acid medium, and it is possible to add to the said structures, by simple mixing, appropriate common manures, oligoelements and fertilizers.

The hydrocarbon base can be a bitumen of direct distillation, blown or not, or a bitumen obtained by blowing a residue of visco-reduction, or an asphaltene of de-asphalting, obtained by precipitation with a saturated hydrocarbon comprising 3 to 7 carbons, residues of distillation, atmospheric or in a vacuum, of viscoreduction or vapor-cracking (steam cracking).

The oxidation agent can be a single acid or a mixture selected from the following common acids: acetic, hydrochloric, nitric, sulfuric, and phosphoric, or a non-acid agent of oxidation (sulfur, potassium permanganate or bichromate.

The mineral compound or mixture of mineral compounds that can react in an acid medium, causing a liberation of gas, can be selected from the alkaline and alkaline-earth carbonates, carbonates of copper, zinc, magnesium, chalk and dolomite.

The use of this type of compound is not indispensable if the reaction between the said hydrocarbon structure and the oxidizer causes a liberation of gas.

The chemically modified bitumens and asphaltenes are therefore prepared by reacting the oxidation agent described above with a homogeneous mixture of bitumen or asphaltenes, and, perhaps, the mineral compound, and incorporating, under agitation, 5 to 50 parts of a mineral compound, preferably 10 to 20 parts, with the hot and liquid hydrocarbon base brought to a temperature of 120° to 240° C., preferably 140° to 180° C.

THe non-acid oxidizers are incorporated directly in the hot mixture at a temperature between 120° and 200° C., preferably 140° to 180° C. The addition must be slow enough to avoid exceeding these temperatures. When all of the oxidizer has been added (5 to 70%/weight and preferably 10 to 40%, the oxidation reaction is continued for 1 to 12 hours, with maintenance of the same temperature as for the addition. The resulting product is then cooled to ambient temperature, and ground to the desired granulometry.

When the oxidation is conducted by an acid, the mixture (bituminous or asphaltenic compound-mineral compound) is cooled to ambient temperature and ground before adding an aqueous solution of an acid or mixtures of acids of a normality comprised between 0.5 and 20 N, preferably 0.5 to 10 N. The reaction is conducted under agitation for 1 to 20 hours at ambient temperature, preferably 2 to 10 hours, then terminated by heating to a temperature between 40° and 80° for 1 to 10 hours. According to the degree of oxidation desired. The product is then recovered by filtration and neutralized by washing in water or with a dilute solution of a mineral base.

The bitumens and asphaltenes of the invention can be mixed in any proportions with the usual solid manures and fertilizers. Their dose of incorporation in the soils can vary between 50 and 2,000 kg/ha, preferably 300 to 1,200 kg/ha, for open-field cultivation and from 0.1 to 5% by weight, preferably 0.5 to 3% for cultivation in pots.

Their activity on plant germination and growth was tested on various plant species and certain agronomic results obtained are mentioned in the examples below, which illustrate this invention in a non-limiting fashion.

EXAMPLE 1

To an 80/100 direct-distillation bitumen of Middle-East origin, characterized by a penetration at 25° C. of 82 in 1/10 mm, add 30% by weight of flowers of sulfur at a temperature of 160° C. The mixture is then agitated for 5 hours at 180°, in the course of which a substantial expansion of the reaction medium takes place, accompanied by a moderate liberation of hydrogen sulfide.

The mixture is then poured hot into metal trays. After cooling, the hard and friable product, quickly becoming covered with a thin, white film of metal sulfates, is ground, then screened to yield granules of a diameter between 1 and 3 mm.

The incorporation of these granules at 5% in sterilized sand reveals the activation of the growth of young shoots of basil in comparison with control cultivated on untreated sand. The mean height and mean weight of the plants are very close to those obtained on natural soil.

EXAMPLE 2

To a 40/50 bitumen of SAFANYIA origin, heated to 160° C. under agitation, add 28% by weight of flowers of sulfur and 7% chalk. The mixture is brought to 185° C. and then maintained at this temperature for 5 hours and 30 minutes. A substantial expansion resulting from the liberation of carbonic gas is observed in the course of this reaction, and the reaction medium becomes very viscous. The product id recovered using the same procedure as described in Example 1, and has a friability and porosity comparable to the product described in Example 1.

When incorporated in a dose of 600 kg/ha in a natural soil, a 13% increase in yield is obtained on a cultivation of corn in the open field.

EXAMPLE 3

If in Example 2, all other things being equal, the chalk is replaced by dolomite, a compound is obtained which has a similar aspect and makes it possible to obtain the results appearing in Table 1 below.

EXAMPLE 4

If, in Example 2, all other things being equal, the chalk is replaced by a mixture of dolomite (95% by weight) and zinc carbonate (5% by weight), a compound is obtained which, aside from its growth-activating activity (Table 1) makes it possible to effectively combat the zinc deficiency of the corn.

EXAMPLE 5

If, in Example 2, all other things being equal, the 40/50 bitumen of SAFANYIA origin is replaced by a bitumen obtained by blowing a residue of visco-reduction, and characterized by a softening point of 90° C. according to AFNOR norm E O 7005, the compound obtained exhibits the agronomic properties appearing in Table 1.

EXAMPLE 6

To a residue of viscoreduction of a distillation residue of Middle-East origin, and characterized by a kinematic viscosity of 192 cSt at 100° C., add 40% by weight of flowers of sulfur at a temperature of 140° C. The mixture is agitated for 2 hours at 140° C., then brought to 185° C. and then maintained for 7 hours. At the end of this reaction time, the liberation of hydrogen sulfide has practically ceased. After cooling, the mixture is recovered as indicated in Example 1 (for results, see Table 1).

EXAMPLE 7

80 parts of asphaltenes obtained by the de-asphalting in n-heptane of a residue of direct distillation of Middle East origin and 20 parts of chalk are heated to 245° C. under agitation until a homogeneous mixture is obtained, which is poured into metal trays. After cooling, the compound is finely ground and added slowly to a normal aqueous solution of hydrochloric acid in the proportion of 1 part of ashaltene-chalk mixture to 1 part of solution. The mixture is then agitated for 2 hours and 30 minutes at ambient temperatures, and 2 hours at 80° C. The reaction product is filtered, washed with water until neutral, and dried to form a powdered, microporous compound exhibiting the properties described in Table 1.

EXAMPLE 8

If, in Example 7, all other things being equal, the hydrochloric acid is replaced by nitric acid, the product obtained exhibits a germination-accelerating effect on plants (Table 2).

EXAMPLE 9

If, in Example 7, all other things being equal, the hydrochloric acid is replaced by a mixture of nitric acid and orthophosphoric acid in the molar ratio of $\frac{2}{3}$, $\frac{1}{3}$, and the chalk by a chalk-dolomite mixture in the same molar ratio, the compound obtained leads to the results mentioned in Table 2.

EXAMPLE 10

If, in Example 7, all other things being equal, the asphaltenes obtained by de-asphalting in n-haptane, of a distillation residue of Middle-East origin, are replaced by a blown 100/40 bitumen, the product obtained is similar to the compound in Example 8 (table 2).

EXAMPLE 11

If, in Example 7, all other things being equal, the relative quantity of chalk is reduced, (90 parts of asphaltenes for 10 parts of chalk), the product obtained is less expanded but much more oxidized, exhibiting very good properties on the germination of tomato seeds (Table 2) and a high power of retention of water and mineral salts.

TABLE 1

GROWTH TEST OF CORN GRAINS
(variety: MAISADOUR, Seed F 7 N )

Conditions of experiment:
number of grains planted: 2 × 16
concentration of hydrocarbon structure: 1% by weight
hydration: 10% water relative to weight of sand
sand sterilized by treatment in hydrochloric acid
and oxygenated water
nutritive elements: N, P, K (classic dose); oligo
elements (KNOPP's liqueur).

|  | Control | Examples | | | | | Control + nutritive elements |
|---|---|---|---|---|---|---|---|
|  |  | 3 | 4 | 5 | 6 | 7 |  |
| Mean length per unit (cm) | 27.4 | 37.4 | 36.2 | 35.5 | 36.2 | 34.9 | 37.3 |
| Mean weight per unit (g) | 0.78 | 1.68 | 1.38 | 1.30 | 1.40 | 1.23 | 1.63 |
| Date of appearance of 5th leaf | | | | | | | |

TABLE 1-continued
GROWTH TEST OF CORN GRAINS
(variety: MAISADOUR, Seed F 7 N )

Conditions of experiment:
number of grains planted: 2 × 16
concentration of hydrocarbon structure: 1% by weight
hydration: 10% water relative to weight of sand
sand sterilized by treatment in hydrochloric acid
and oxygenated water
nutritive elements: N, P, K (classic dose); oligo
elements (KNOPP's liqueur).

|  | Con- trol | Examples | | | | Control + nutritive elements |
|---|---|---|---|---|---|---|
|  |  | 3 | 4 | 5 | 6 | 7 |  |
| (day) | 27 | 22 | 23 | 21 | 23 | 23 | 22 |

TABLE 2
TESTS OF GERMINATION OF TOMATO SEEDS
(varieties: Hybrid $F_1$ Quatuor, Clause seeds)
Conditions of experiment: identical to those of TABLE 1

|  | CONTROL | EXAMPLES | | | | CONTROL + NUTRITIVE ELEMENTS |
|---|---|---|---|---|---|---|
|  |  | 8 | 9 | 10 | 11 |  |
| Appearance 2nd Leaf (Day) | 5 | 5 | 5 | 5 | 5 | 5 |
| Appearance 3rd Leaf (Day) | 17 | 13 | 14 | 13 | 13 | 14 |
| Appearance 4th Leaf (Day) | 27 | 17 | 18 | 17 | 16 | 21 |
| Appearance 5th Leaf (Day) | — | 20 | 21 | 20 | 19 | 26 |

We claim:

1. A microporous fertilizing composition which aids in retaining water in soil and accelerates the growth of plants produced by the process comprising: mixing a normally solid hydrocarbon base containing asphaltenes at a temperature at which it is fluid with a pulverulent material selected from the group consisting of oxidizing agents which liberate gas when reacted with the hydrocarbon base selected from the group consisting of sulfur, potassium permanganate and potassium bichromate, mineral compounds which liberate a gas in an acid medium and mixtures thereof; causing said gas to be liberated to form the microporous composition and incorporating therein effective amounts of fertilizer.

2. A composition of claim 1 prepared by the process wherein an oxidizing agent which liberates gas when reacted with the hydrocarbon base and at least one compound, which is capable of reacting in an acid medium to liberate a gas, selected from the group consisting of alkaline carbonates, alkaline earth metal carbonates, carbonates of zinc, copper and magnesium, chalk and dolomite are mixed with the hydrocarbon base containing asphaltenes.

3. A composition of claim 1 or 2 prepared by the process wherein from 25 to 50% by weight the oxidizing agent and 5 to 10% by weight of said at least one compound capable of reacting in an acid madium to liberate a gas are mixed with the fluid hydrocarbon base to form a mixture, maintaining the mixture at a temperature of from 180° to 250° C. for 5 to 7 hours, cooling the product, grinding and screening the solid material thus formed to produce granules having a diameter in the range of 1 to 3 mm.

4. A composition of claim 3 produced by a process including the additional steps of introducing the granules into an aqueous solution of at least one acid of a normality between 0.5 N and 20 N to form a slurry, agitating the slurry at ambient temperature for at least one hour, heating the slurry to a temperature in the range of 40° to 80° C. for at least one hour, separating the granules from the slurry, washing the granules until neutral and drying the granules.

5. A composition of claim 4 produced by the process wherein the slurry is agitated at ambient temperature for about 2–5 hours and then heated at 80° C. for at least 2 hours.

6. A process for accelerating the germination and growth of plants which comprises incorporating in the soil, an effective amount of a composition of claim 1 or 2.

7. A process for accelerating the germination and growth of plants which comprises incorporating in the soil, an effective amount of a composition of claim 3.

8. A process for accelerating the germination and growth of plants which comprises incorporating in the soil, an effective amount of a composition of claim 4.

9. A process for accelerating the germination and growth of plants which comprises incorporating in the soil, an effective amount of a composition of claim 5.

* * * * *

UNITED STATES PATENT AND TRADEMARK OFFICE
CERTIFICATE OF CORRECTION

PATENT NO. : 4,353,729

DATED : October 12, 1982

INVENTOR(S) : Faure et al

It is certified that error appears in the above-identified patent and that said Letters Patent is hereby corrected as shown below:

Column 2, line 35: change "THe" to --The--

Column 3, line 30: change "id" to --is--

Column 4, last line should read:
-- 5th leaf (day) 27  22  23  21  23  23  22--

Column 5, delete lines 1 through 15 in their entirety

Column 6, line 13: change "madium" to --medium--

*Signed and Sealed this*

*Twenty-ninth* Day of *May 1984*

[SEAL]

*Attest:*

GERALD J. MOSSINGHOFF

*Attesting Officer*     *Commissioner of Patents and Trademarks*